3,423,316
ORGANIC COMPOSITIONS HAVING ANTIWEAR PROPERTIES

Joseph J. Dickert, Jr., Lower Makefield Township, Bucks County, Pa., Israel J. Heilweil, Princeton, N.J., and Carleton N. Rowe, Lower Makefield Township, Bucks County, Pa., assignors to Mobil Oil Corporation, a corporation of New York
No Drawing. Filed Sept. 20, 1966, Ser. No. 580,604
U.S. Cl. 252—32.7          12 Claims
Int. Cl. C10m *1/48*

---

ABSTRACT OF THE DISCLOSURE

Industrial compositions, such as lubricating oils have improved antiwear properties by the presence therein of (1) a metal phosphorodithioate or a phosphorodithioic acid or anhydride and (2) a cyclic oxy, hydroxy or hydrazine compound or an organoammonium borohydride.

---

This invention relates to novel compositions having antiwear properties. In particular, this invention relates to organic fluids containing additives which provide enhanced antiwear properties thereto.

The metal surfaces of machinery or engines operating under heavy load wherein metal slides against metal, such as bearings, may undergo excessive wear or corrosion. Often the lubricants for such operations cannot prevent wear and corrosion of the metal and, as a result, the performance of the machine suffers. Lubricating oils have been blended with additives to increase the antiwear properties, however they have not always provided satisfactory protection. Lubricating compositions having improved antiwear properties are of primary consideration for such performance.

It is an object of this invention to provide organic fluids having improved antiwear properties. Another object of this invention is to provide lubricating compositions which can prevent undue wear of metal surfaces.

These and other objects are satisfied by novel fluid compositions containing a major portion of an organic fluid and a minor portion sufficient to provide such fluids with enhanced antiwear characteristics of an 0,0-diorganophosphorodithioate compound and an organic activating co-additive containing oxygen or nitrogen or boron. Preferably the organic co-additive is an oxygen- or nitrogen-containing cyclic compound or an alkylated boron compound. This combination of additives in organic fluids provides synergistic antiwear characteristics.

The diorganophosphorodithioate compound used in this invention has the following structure:

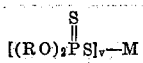

wherein R may be alkyl, alkylene, cycloalkyl, aralkyl, aryl and alkaryl, having from 1 to about 30 carbon atoms, M may be hydrogen or a metal of Groups IB, IIB, IVA, VIB and VIII of the Periodic Table and *v* is the valence of M. Of the suitable metals, M may preferably be copper, zinc, mercury, silver, lead, tin, chromium, cadmium, cobalt or nickel. M may also be

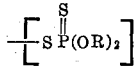

the anhydride form of the diorganophosphorodithioic acid. The organic portion may be methyl, ethyl, proyl, iso-propyl, butyl, t-butyl, pentyl, neopentyl, phenyl, toluyl and the like.

The phosophorodithioate compounds are generally produced by initially reacting an alcohol or a phenol with phosphorus pentasulfide. This preparation is well known in the art. Two different alcohols may be used and therefore R, as defined above, may consist of different radicals. The resulting diorganophosphorodithioic acid or its anhydride form may be used in this invention. To produce the metal salts, the phosphorodithioic acid may be reacted with ammonia to form an ammonium phosphorodithioate intermediate. This intermediate may then be reacted with a metal halide to produce the desired metal salt. The salt precipitates out of the reaction mixture and may be isolated therefrom by the usual means of separation. This method of producing the metal salts of this invention is preferred, although the invention is not limited to a specific synthesis.

The activating co-additives of this invention are oxygen- nitrogen- or boron-containing organic compounds. The preferred classes are (1) cyclic oxy, hydroxy or hydrazine compounds or (2) organoammonium borohydrides, wherein the organic portion contains at least 4 carbon atoms, and preferably from 4 to 40.

The cyclic co-additives of this invention have the general structure:

wherein Ar may be phenylene or naphthylene; X may be, —OH or —NHNH$_2$; R′ may be alkyl, aryl, alkaryl and aralkyl each containing from 1 to about 30 carbon atoms; *m* may be 1 or 2 and *n* may range from 0 to 5 (when *n* is O, the nucleus contains the normal hydrogen atoms). The cyclic oxy co-additive may also be a quinone. Thus the co-additives of this invention include quinones, hydroquinones, phenols, napthols, phenylene diols, naphthalene diols, phenyl hydrazines, naphthyl hydrazines and substituted derivatives theerof. The organic substituents on the aromatic nucleus may range from methyl to eicosyl and may completely fill the available positions on the said nucleus. These aromatic compounds may be obtained by known methods and many are commercial preparations.

The organoammonium borohydrides useful in this invention include compounds of the structure:

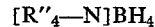

wherein R″ is alkyl, or aryl having from 1 to 20 carbon atoms and may be the same or different. Preferred of this class is cetyltrimethylammonium borohydride. These compounds may also be prepared by known commercial methods.

The additive combination of this invention may be present in the organic media at concentrations ranging from 0.05% to about 10% by weight of the total composition. The diorganophosphorodithioate is preferably present with respect to the activating agent in a weight ratio of from about 1:1 to about 8:1. The phosphorodithioates may themselves provide some antiwear properties, however, it has been found in accordance with the discovery of this invention that the presence of the co-additive increases the antiwear properties to an extent greater than that provided by each of the components alone. In fact, several of these metal salts provide little or no improvement in antiwear activity of the base fluid. Yet with the addition of a small amount of the co-additive, the antiwear properties are exceptional. This surprising result is believed to be a synergistic cooperation between the two additives.

The following examples describe the invention more clearly although the scope of the invention is not limited thereto. Reference to parts or precent is on a weight basic unless otherwise specified.

EXAMPLES

The antiwear properties of the additives of this invention are evaluated in the following test:

A stationary pin is held upright against axially-mounted rotatable disc, and the disc is rotated at a constant velocity. The pin, by virtue of this rotation, describes a circle on the surface of the disc concentric with the axis thereof. Both pin and disc are contained in a vessel holding the test lubricant so the point of contact between the pin and the rotating disc is lubricated at all times. The pin is made of AISI 1020 steel and has a hemispherical tip. The disc is also made of AISI 1020 steel and is 7.6 cm. in diameter. The force of the pin against the disc may be changed by varying the load using the controls outside of the lubricant vessel.

The lubricating compositions of this invention were tested at a load of 8 kg. using a sliding velocity of 10 cm. per second. The concentration of the additives in the lubricant composition was varied as set forth in the tabulated data below. The tests were run at 93.3° C. and each test lasted for 5 hours. Cetane (n-hexadecane) was used as the base fluid.

After the test was completed in each case the pin was examined to measure the wear scar diameter. The wear rate is in terms of volume per travel distance (cc./cm.) and was determined from the scar diameter. The coefficient of friction was also calculated. When cetane was tested alone, with no additives at all, the wear rate was $25{,}000 \times 10^{-10}$ cc./cm., and the coefficient of friction was about 1.2.

(A) A composition of cetane and 0.375% by weight of cupric O,O-diisopropylphosphorodithioate was tested, along with several co-additives. The following results were obtained:

TABLE I

| Co-additive | Wt. percent | Coeff. of Friction | Wear Rate, cc./cm.$\times 10^{-10}$ |
| --- | --- | --- | --- |
| None | | 0.23 | 35.9 |
| Phenylhydrazine | 0.083 | 0.25 | 0.0863 |
| 1,4-naphthalenediol | 0.183 | 0.20 | 0.191 |
| Methylhydroquinone | 0.142 | 0.29 | 0.396 |
| Tri-n-hexadecylhydroquinone | 0.89 | 0.13 | 0.132 |
| 1,4-naphthoquinone | 0.180 | 0.17 | 0.322 |
| Cetyltrimethylammonium borohydride | 0.190 | | 0.333 |

(B) The same series of tests were performed using 0.37% of nickel O,O-diisopropylphosphorodithioate. The following results were obtained:

TABLE II

| Co-additive | Wt. percent | Coeff. of Friction | Wear Rate, cc./cm.$\times 10^{-10}$ |
| --- | --- | --- | --- |
| None | | | (¹) |
| Methylhydroquinone | 0.142 | 0.17 | 0.261 |
| Cetyltrimethylammonium borohydride | 0.190 | | 0.340 |

¹ Scuffing.

(C) The same tests were performed using 0.325% of chromium O,O-diisopropylphosphorodithioate with the following results:

TABLE III

| Co-additive | Wt. percent | Coeff. of Friction | Wear Rate, cc./cm.$\times 10^{-10}$ |
| --- | --- | --- | --- |
| None | | | ¹ 1,590.0 |
| Methylhydroquinone | 0.146 | 0.19 | 0.466 |
| Cetyltrimethylammonium borohydride | 0.190 | | 4.96 |

¹ 22 minutes.

(D) Mercuric O,O-dineopentylphosphorodithioate compositions were tested by the same test with the following results:

TABLE IV

| Co-additive | Wt. percent | Coeff. of Friction | Wear Rate, cc./cm.$\times 10^{-10}$ |
| --- | --- | --- | --- |
| None (0.591% mercuric salt) | | 0.21 | 32.1 |
| Phenylhydrazine (0.565% mercuric salt) | 0.083 | 0.14 | 3.18 |

(E) Silver O,O-diisopropylphosphorodithioate was tested in cetane by the same test with the following results:

TABLE V

| Co-additive | Wt. percent | Coeff. of Friction | Wear Rate, cc./cm.$\times 10^{-10}$ |
| --- | --- | --- | --- |
| None (0.49% silver salt) | | 0.35 | 1.48 |
| 1,4-naphthalenediol (0.42% silver salt) | 0.183 | 0.094 | 0.0529 |

(F) Lead O,O-diisopropylphosphorodithioate was tested in cetane according to the above test with the following results:

TABLE VI

| Co-additive | Wt. Percent | Coeff. of Friction | Wear Rate, cc./cm.$\times 10^{-10}$ |
| --- | --- | --- | --- |
| None (0.48% lead salt) | | 0.57 | 3.45 |
| Methylhydroquinone | 0.142 | 0.17 | 0.132 |

(G) O,O-diisopropylphosphorodithioic acid was tested according to the above test with the following results:

TABLE VII

| Co-additive | Wt. Percent | Coeff. of Friction | Wear Rate, cc./cm.×10⁻¹ |
|---|---|---|---|
| None (0.326% acid) | | | 45.9 |
| Methylhydroquinone (0.328% acid) | 0.142 | 0.24 | 0.437 |

(H) An anhydride form of O,O-diisopropylphosphorodithiocic acid was tested by the same test at a concentration of 0.325%, with the following results:

TABLE VIII

| Co-additive | Wt. Percent | Coeff. of Friction | Wear Rate, cc./cm.×10⁻¹⁰ |
|---|---|---|---|
| None | | 0.20 | 15.6 |
| Methylhydroquinone | 0.142 | 0.19 | 2.62 |

The activating agents used in conjunction with the phosphorodithioates to form the synergistic mixtures of this invention were tested alone in cetane at approximately the same concentrations as used in the above tests. No phosphorodithioate was present. These results are tabulated below:

| Activating Agent | Wt. Percent | Coeff. of Friction | Wear Rate, cc./cm.×10⁻¹⁰ |
|---|---|---|---|
| Methylhydroquinone | 0.142 | 0.24 | 2.53 |
| Tri-n-hexadecyl hydroquinone | 0.89 | 0.21 | 1.05 |
| 1,4-naphthalene-diol | 0.183 | 0.35 | 1.82 |
| Phenylhydrazine | 0.083 | 0.29 | 3.42 |
| 1,4-naphthoquinone | 0.180 | | 0.763 |
| Cetyltrimethyl ammonium borohydride | 0.190 | | 1,120.0 |

FOUR-BALL WEAR TEST

In this test, three steel balls of 52-100 steel are held in a ball cup. A fourth ball positioned on a rotatable vertical axis is brought into contact with the three balls and is rotated against them. The force which the fourth ball is held against the three stationary balls may be varied according to a desired load. The test lubricant is added to the ball cup and acts as a lubricant for the rotation. At the end of the test, the steel balls are investigated for wear scar; the extent of scarring represents the effectiveness of the lubricant as an anti-wear agent. A number of metal O,O-diisopropylphosphorodithioates were used in these tests. They were combined with methylhydroquinone (MHQ) as an activating agent. The tests were conducted under a load of 20 kg. at 200° F. for 60 minutes. The rotational speed was 600 r.p.m. or 23.3 cm./sec. sliding speed. The concentration of the phosphorodithioate in the composition was sufficient to provide 1.5×10⁻³ gram-atoms of phosphorus per 100 grams of sample; the methylhydroquinone concentration was 1.1×10⁻³ mole per 100 grams of sample. The lubricant carrier was cetane. The results are tabulated below:

| | Additives | Ave. Wear Scar, mm. | Wear Volume in cc. | Coeff. of Friction |
|---|---|---|---|---|
| Comp.: | | | | |
| 1 | Copper salt | 0.475 | 6.91×10⁻⁷ | 0.14 |
| 2 | Copper salt+MHQ | 0.460 | 5.99×10⁻⁷ | 0.11 |
| 3 | Nickel salt | 1.145 | 264.0×10⁻⁷ | 0.27 |
| 4 | Nickel salt+MHQ | 0.692 | 34.1×10⁻⁷ | 0.14 |
| 5 | Zinc salt | 1.305 | 477.0×10⁻⁷ | 0.27 |
| 6 | Zinc salt+MHQ | 0.480 | 7.24×10⁻⁷ | 0.17 |

It may thus be seen that the additive combinations of this invention provides unexpected improvement in the antiwear properties of a hydrocarbon fluid. The composition of this invention may contain other additives such as detergents and extreme pressure agents, viscosity controlling agents, and the like, depending upon the characteristics required for a specific utiliity.

This invention has been described by the use of specific examples and embodiments, however the scope of the invention is not considered to be limited thereby except as described in the following claims.

We claim:
1. A lubricant composition comprising a major amount of a lubricating oil and a minor amount of a mixture of compounds consisting of:
 (1) a diorganophosphorodithioate compound having the structure

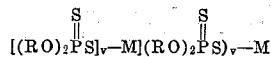

wherein R is a hydrocarbyl radical having from 1 to about 30 carbon atoms, M is selected from the group consisting of hydrogen,

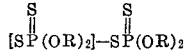

and a metal, and $v$ is the valence of M; and
 (2) an organic activating agent selected from the group consisting of (a) a quinone, (b) an aromatic diol, (c) an aromatic hydrazine, and (d) an organoammonium borohydride, said (a), (b) and (c) having the structure

[R'n—[Ar]Xm] R'n—(Ar)Xm wherein R' is a hydrocarbyl radical having from 1 to about 30 carbon atoms, $n$ is in the range of 0 to 5, and the group [—[Ar]Xm] —(Ar)Xm is selected from the group consisting of
 (a) a quinone in which Ar is a quinone nucleus, X=0 and $m$ is 2, and M is selected from the group consisting of metal and

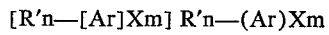

(b) an aromatic diol in which Ar is selected from the group consisting of phenylene and naphthylene, X is OH, M is selected from the group consisting of hydrogen and metal and $m$ is 2; and
 (c) an aromatic hydrazine in which Ar is selected from the group consisting of phenyl and naphthyl, X is —NH—NH$_2$ and $m$ is 1;

and said (d) having the structure (R″$_4$—N)BH$_4$ wherein R″ is selected from the group consisting of alkyl and aryl having from 1 to 20 carbon atoms, in which each R″ group need not be the same as any of the others;

wherein each of said compounds of the mixture is present in sufficient amount to provide improved anti-wear properties to the lubricant composition.

2. The composition of claim 1 wherein the activating agent is a hydroquinone.

3. The composition of claim 1 wherein the activating agent is a naphthylene diol.

4. The composition of claim 1 wherein the activating agent is naphthoquinone.

5. The composition of claim 1 wherein the diorganophosphorodithioate is a metal 0,0-diorganophosphorodithioate wherein the metal is a member of the group consisting of IB, IIB, IVA, VIB and VIII of the Periodic Table.

6. The composition of claim 5 wherein the metal is selected from the group consisting of zinc, lead, copper, silver, mercury, chromium and nickel.

7. The composition of claim 1 wherein the activating agent is an aromatic hydrazine.

8. The composition of claim 7 wherein the activating agent is phenylhydrazine.

9. The composition of claim 1 wherein the activating agent is cetyltrimethylammonium borohydride.

10. A mixture of additives contained in the lubricant composition of claim 1.

11. The mixture of claim 10 wherein the activating agent is selected from the group consisting of a hydroquinone, a naphthoquinone, a phenylhydrazine and alkyl derivatives thereof.

12. The mixture of claim 10, wherein the activating agent is cetyltrimethylammonium borohydride.

References Cited

UNITED STATES PATENTS

| | | | |
|---|---|---|---|
| 2,234,581 | 3/1941 | Rosen | 252—49.6 |
| 2,739,122 | 3/1956 | Kennerly et al. | 252—32.7 |
| 2,789,951 | 4/1957 | Kern et al. | 252—32.7 |
| 2,906,770 | 9/1959 | Debo | 252—46.7 XR |
| 2,934,499 | 4/1960 | Goldschmidt | 252—32.7 |
| 2,975,136 | 3/1961 | Thomas et al. | 252—50 XR |
| 3,070,546 | 12/1962 | Butler et al. | 252—32.7 |
| 3,143,507 | 8/1964 | Mastin et al. | 252—46.6 |
| 3,318,808 | 5/1967 | Plemich et al. | 252—32.7 |

DANIEL E. WYMAN, *Primary Examiner.*

PATRICK P. GARVIN, *Assistant Examiner.*

U.S. Cl. X.R.

252—46.6, 46.7, 49.6, 50, 52

UNITED STATES PATENT OFFICE
CERTIFICATE OF CORRECTION

Patent No. 3,423,316 January 21, 1969

Joseph J. Dickert, Jr., et al.

It is certified that error appears in the above identified patent and that said Letters Patent are hereby corrected as shown below:

Column 2, line 7, "proyl" should read -- propyl --; line 44, "napthols" should read -- naphthols --; line 46, "theerof" should read -- thereof --. Column 3, line 37, after "against" insert -- an --. Column 5, line 70, "provides" should read -- provide --. Column 6, lines 21 and 22, the formula should appear as shown below:

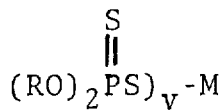

same column 6, lines 39 and 40, the formula should appear as shown below:

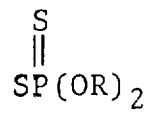

same column 6, line 48, the formula should read -- $R'n-(Ar)Xm$ --; line 51, "$[-[Ar]Xm]-(Ar)Xm$" should read -- $-(Ar)Xm$ --; lines 56 and 57, the formula should appear as shown below:

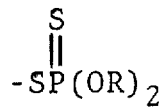

Signed and sealed this 24th day of March 1970.

(SEAL)
Attest:

EDWARD M. FLETCHER, JR.
Attesting Officer

WILLIAM E. SCHUYLER, JR.
Commissioner of Patents